United States Patent
Oneid

(10) Patent No.: US 9,494,459 B2
(45) Date of Patent: Nov. 15, 2016

(54) SELF-LEVELING SCALE

(71) Applicant: Portal 724, LLC, Secaucus, NJ (US)

(72) Inventor: George Oneid, Little Falls, NJ (US)

(73) Assignee: Portal 724, LLC, Secaucus, NJ (US)

( * ) Notice: Subject to any disclaimer, the term of this patent is extended or adjusted under 35 U.S.C. 154(b) by 54 days.

(21) Appl. No.: 14/556,186

(22) Filed: Nov. 30, 2014

(65) Prior Publication Data

US 2016/0153826 A1 Jun. 2, 2016

(51) Int. Cl.
*G01G 3/14* (2006.01)
*G01G 21/22* (2006.01)

(52) U.S. Cl.
CPC ............ *G01G 3/1402* (2013.01); *G01G 21/22* (2013.01)

(58) Field of Classification Search
CPC ............................. G01G 3/1402; G01G 21/22
See application file for complete search history.

(56) References Cited

U.S. PATENT DOCUMENTS

| | | | | | |
|---|---|---|---|---|---|
| 4,466,297 | A * | 8/1984 | Hafner | ................ | G01G 3/1402 177/DIG. 9 |
| 4,601,356 | A * | 7/1986 | Muccillo, Jr. | ........ | G01G 3/1402 177/132 |
| 4,739,848 | A * | 4/1988 | Tulloch | ................ | G01G 3/1402 177/211 |
| 4,993,506 | A * | 2/1991 | Angel | .................... | G01G 19/44 177/211 |
| 5,205,369 | A * | 4/1993 | Neeleman | ............ | G01G 3/1412 177/229 |
| 5,250,762 | A * | 10/1993 | Gustafsson | ........... | G01L 1/2243 177/211 |
| 6,407,351 | B1 * | 6/2002 | Meyer | ...................... | F16M 7/00 177/238 |
| 6,639,158 | B2 * | 10/2003 | Germanton | ............ | G01G 19/44 177/238 |
| 7,910,841 | B2 * | 3/2011 | Germanton | ............ | G01G 21/23 108/57.12 |
| 8,853,567 | B2 * | 10/2014 | Gottfriedsen | .......... | G01G 23/48 177/229 |
| 2009/0152021 | A1 * | 6/2009 | Tamborini | ............. | G01G 21/22 177/262 |
| 2009/0183928 | A1 * | 7/2009 | Oseko | .................. | G01G 3/1402 177/211 |
| 2015/0101870 | A1 * | 4/2015 | Gough | .................. | G01G 3/141 177/211 |

* cited by examiner

*Primary Examiner* — Randy W Gibson
(74) *Attorney, Agent, or Firm* — Ice Miller LLP

(57) ABSTRACT

A weighing scale for measuring the weight of an object is disclosed. The weighing scale includes a base portion, a platform extending along a plane above the base portion to support the object, and at least one peg extending below the platform along an axis that is adjustable from a first position perpendicular to the plane to a second position not perpendicular to the plane.

20 Claims, 4 Drawing Sheets

SELF-LEVELING SCALE

BACKGROUND

Weighing scales, such as body scales or bathroom scales, typically include a top surface or platform, feet or pegs resting on a floor or other surface, and one or more weight sensors. When an object such as the body of a person is placed on the platform, the weight sensor determines the weight of the object by measuring the difference between the downward force that the object applies to the scale relative to the static upward force from the one or more pegs resting on the floor or surface. However, if the weighing scale is positioned on an uneven or soft surface, such as a floor having carpeting or uneven tiles, the static upward force received by the weighing scale sensor may be inaccurate due to one or more surfaces of the floor or support surface not being level or coplanar or being soft enough to cause angled contact between the support surface and the pegs. This often results in an inaccurate determination and indication of weight by the weighing scale.

Therefore, there exists a need for a weighing scale with one or more pegs that determines and indicates a weight with a degree of accuracy when the weighing scale is positioned on one or more support surfaces that are not coplanar, level, or sufficiently hard.

SUMMARY

In accordance with aspects of the present disclosure, a weighing scale for measuring the weight of an object is disclosed. The weighing scale includes a base portion, a platform extending along a plane above the base portion to support the object, and a peg having an upper portion, which peg extends below the platform along an axis that is adjustable from a first position perpendicular to the plane to a second position not perpendicular to the plane.

In accordance with further aspects of the present disclosure, a weighing scale for measuring the weight of an object is disclosed. The weighing scale includes a base portion, a platform extending along a first plane above the base portion to support the object, a first peg having an upper portion, which first peg extends below the platform and defines a first axis, and a second peg having an upper portion, which second peg extends below the platform and defines a second axis, wherein at least one of the first peg and the second peg is adjustable to a position whereby the first axis is not parallel with the second axis.

In accordance with further aspects of the present disclosure, a weighing scale for measuring the weight of an object is disclosed. The weighing scale includes an upper portion having a top surface configured to support the object, and a base portion comprising a first peg and a second peg, wherein the first peg includes an upper portion and a first bottom surface, which first bottom surface is moveable to align with a first support surface and the second peg includes an upper portion and a second bottom surface, which second bottom surface is moveable to align with a second support surface nonparallel to the first support surface.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
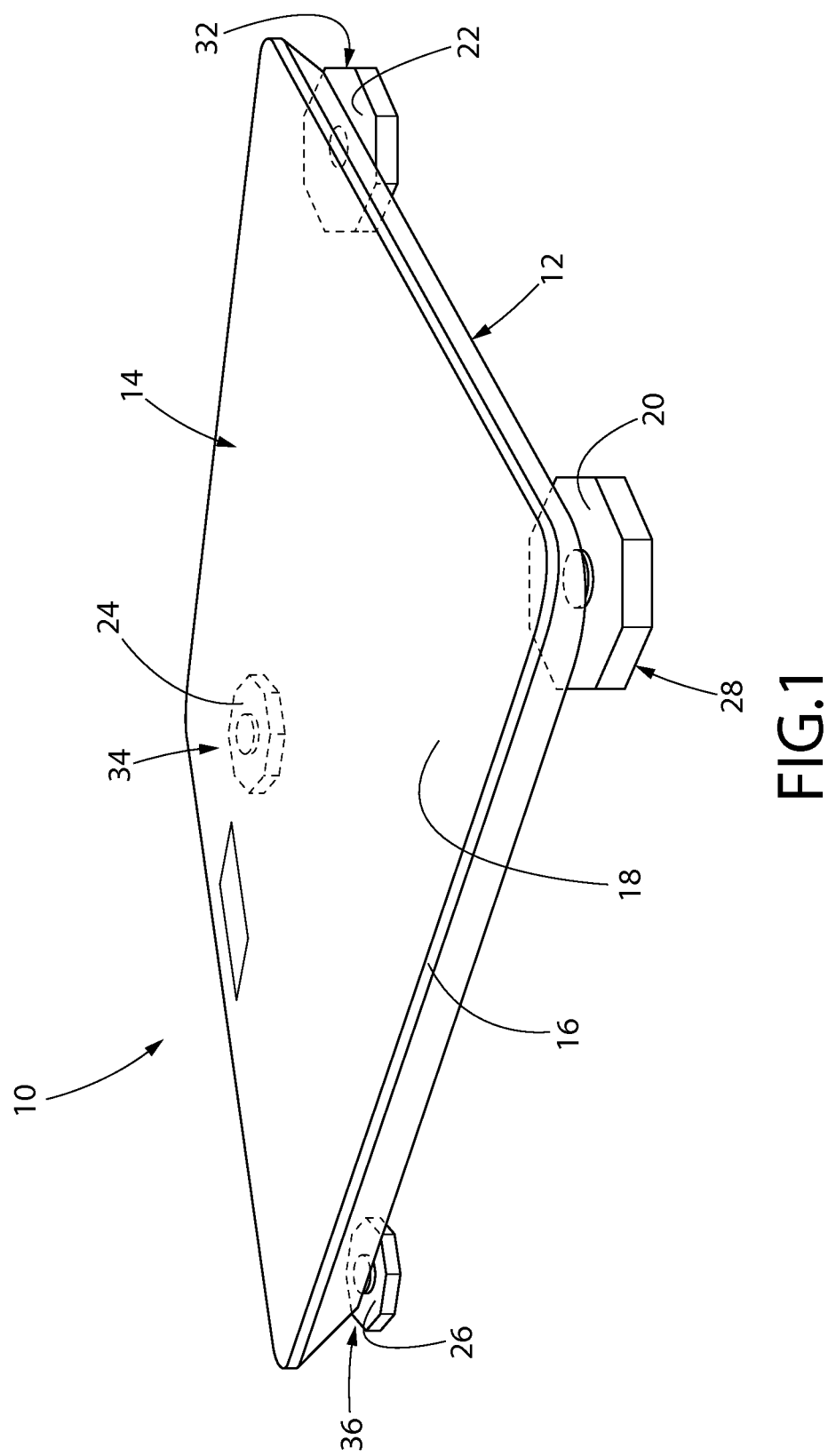
FIG. 1 is a perspective view of a weighing scale in accordance with aspects of the present disclosure.

Reference is now made to FIG. 1, which shows a weighing scale 10 for measuring the weight of an object. The weighing scale 10 generally includes a base portion 12 and an upper portion 14. The upper portion 14 includes a top surface or platform 16 that is configured to support an object, such as the body of a person, to determine the weight of the object. In one or more embodiments, the platform 16 extends along a plane 18 above the base portion 12. In an embodiment, the weighing scale 10 is positioned on a floor, and a person steps onto the weighing scale 10 such that the person's entire body weight is supported by the top surface or platform 16. The weighing scale 10 further includes a plurality of pegs 20, 22, 24, 26 extending below the platform 16. In the embodiment shown in FIG. 1, a first peg 20, a second peg 22, a third peg 24, and a fourth peg 26 are disposed at each corner of the square weighing scale 10. The weighing scale 10 may be formed of any shape or geometry, and any number of pegs may form part of the weighing scale 10 in one or more embodiments of the present disclosure.

Referring now to the embodiment shown in FIG. 2, the base portion 12 of the weighing scale 10 includes a first peg assembly 28 having the first peg 20 and an electronic sensor 30 disposed below the platform 16. In one or more embodiments, the second peg 22, the third peg 24, and the fourth peg 26 form part of a second peg assembly 32, a third peg assembly 34, and a fourth peg assembly 36, respectively, as referenced in FIG. 1, one or more of which may be identical to the first peg assembly 28 shown in FIG. 2. However, any one or more of the second peg 22, third peg 24, and fourth peg 26 may be fixed or not adjustable in one or more embodiments of the present disclosure; and any one or more of the second peg assembly 32, third peg assembly 34, and fourth peg assembly 36 may be fixed or not adjustable in one or more embodiments of the present disclosure. In addition, any one or more of the peg assemblies 32, 34, 36 that are fixed or not adjustable may comprise a peg but not an electronic sensor 30. For purposes of the present disclosure, the peg 20 refers to any one or more of the first peg 20, second peg 22, the third peg 24, and the fourth peg 26, and the peg assembly 28 refers to any one or more of the first peg assembly 28, the second peg assembly 32, the third peg assembly 34, and the fourth peg assembly 36.

Figure 2:
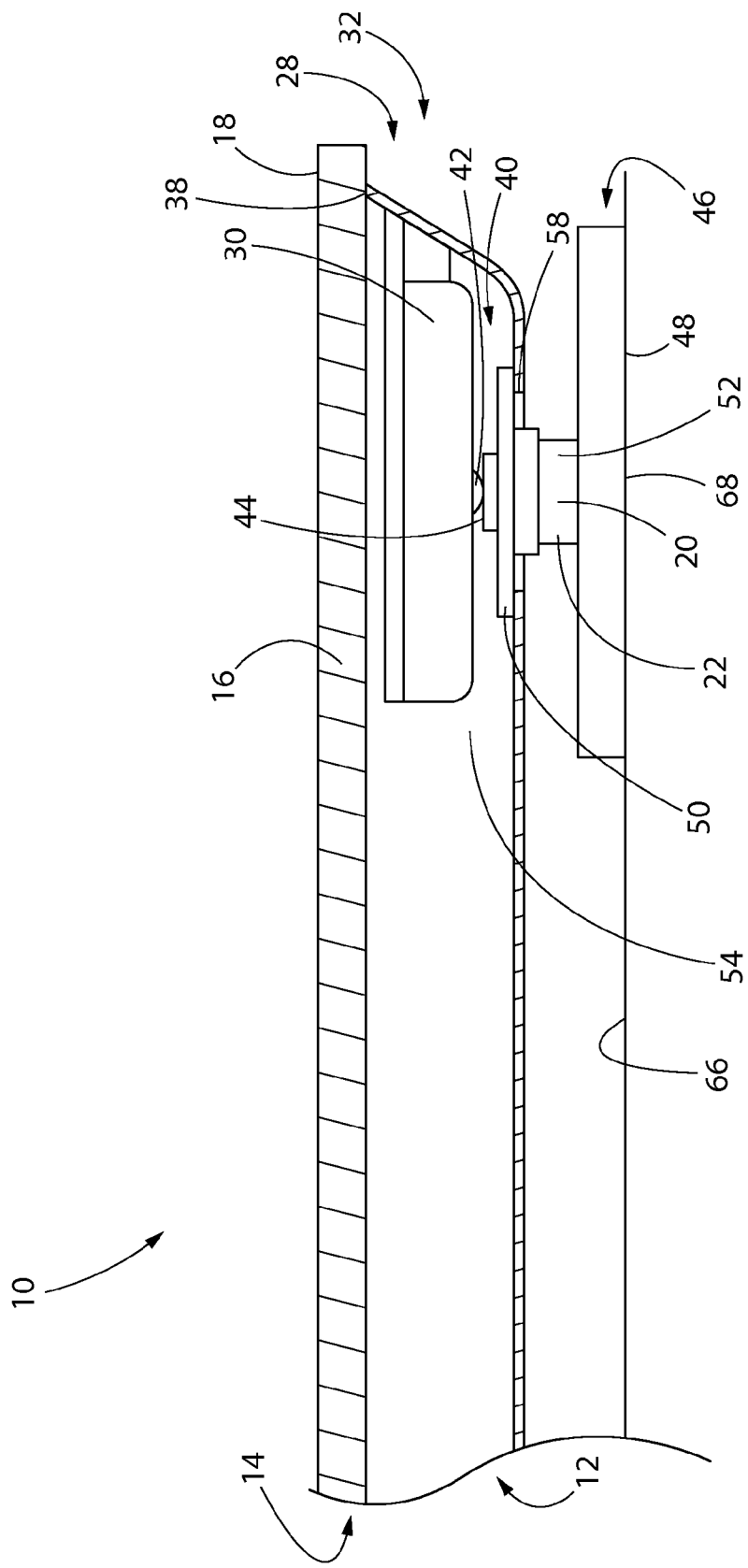
FIG. 2 is an enlarged cross sectional view of a weighing scale in accordance with further aspects of the present disclosure.
Figure 3:
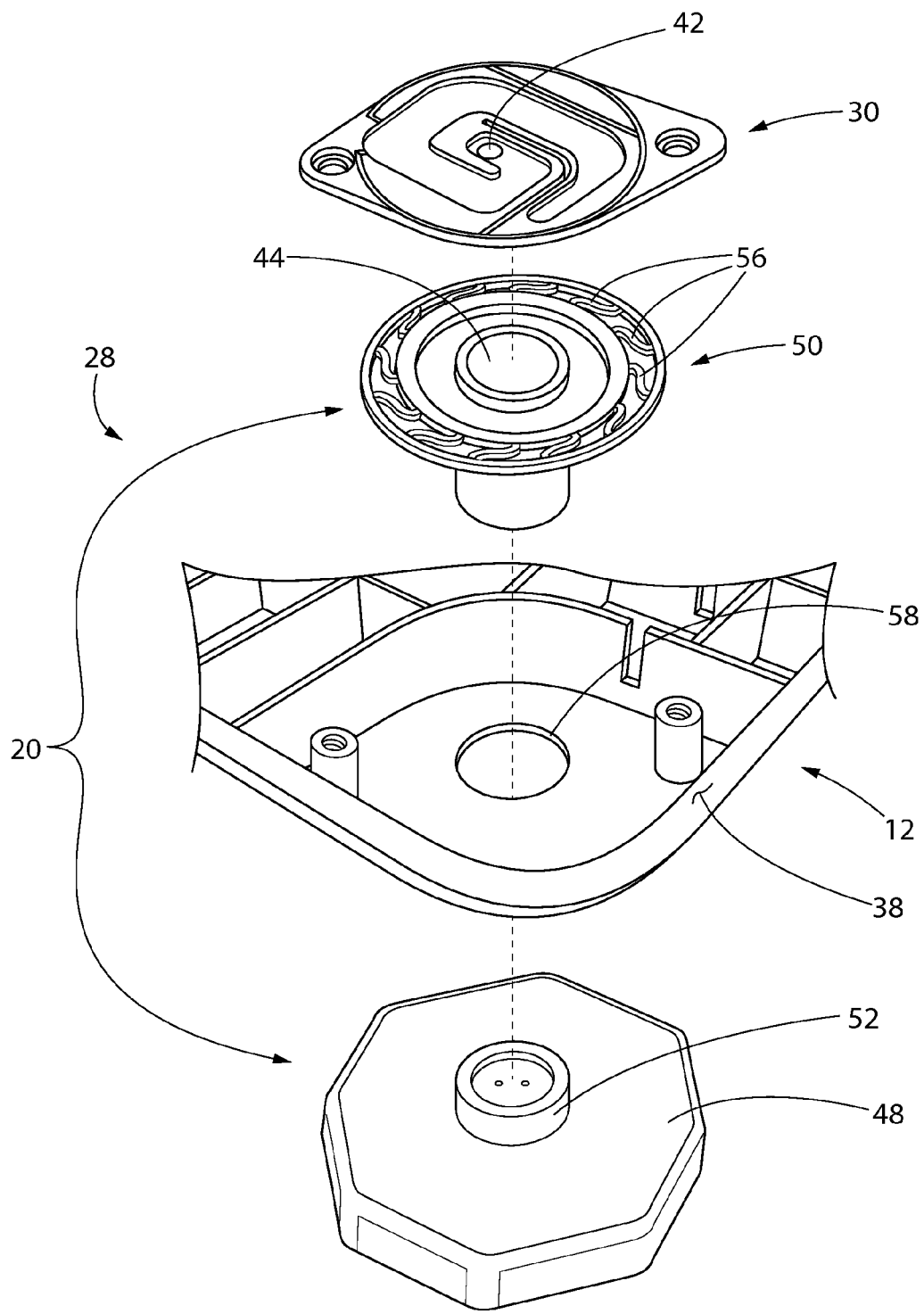
FIG. 3 is a partially exploded view of a weighing scale in accordance with further aspects of the present disclosure.

The platform 16 of the weighing scale 10 shown in the embodiment of FIG. 2 is rigidly coupled to a top side 38 of the base portion 12. The sensor 30 of the embodiment is rigidly coupled to the base portion 12. As shown in FIGS. 2 and 3, the sensor 30 is positioned above the peg 20 at an upper portion 40 of the peg 20 such that a sensor protrusion 42 contacts a top surface 44 of the peg 20. In an embodiment, at least part of the upper portion 40 of the peg 20 is constructed of a hard material to effectively transmit force from the peg 20 to the sensor protrusion 42. By way of example and not of limitation, the upper portion 38 of the peg 20 may be constructed of plastic, metal, glass, wood, or another suitably hard material. The sensor 30, shown in the embodiment of FIGS. 2 and 3, senses a force value between the peg 20 and the platform 16 using a strain gauge or similar electronic measuring device. The sensed force value may then be transmitted to a processor, circuit, telecommunications module, display, and/or other device (none of which are shown) as a signal to determine, process, or indicate the weight of the object. One of ordinary skill in the art will recognize various instruments and devices, such as, by way of example and not of limitation, electronic or mechanical devices, that may be utilized to measure, process, and/or report the weight of an object, any of which may be used to form the sensor 30 and associated weight-indicating components in one or more embodiments of the present invention.

The peg 20 of the peg assembly 28 of the embodiment shown in FIGS. 2 and 3 includes a lower peg portion 46 having a bottom surface 48, a compliant member 50 positioned at the upper portion 40 of the peg 20, and a central peg portion 52 positioned between the lower peg portion 46 and the compliant member 50. As shown in FIG. 2, the compliant member 50 and at least part of the central peg portion 52 are positioned at an interior space 54 of the base portion 12 of the weighing scale 10.

Referring now to FIG. 3, in an embodiment of the present disclosure, the compliant member 50 is a flexible disk, and may be constructed of, by way of example and not of limitation, a plastic, elastomer, or other material having elastic or resilient properties. The compliant member 50 of the embodiment shown in FIG. 3 includes a circular array of circumferentially spaced flex members 56. The compliant member 50 of an embodiment forms part of the peg 20 to retain the peg 20 in the base portion 12 while allowing angular movement or adjustment of the peg 20. As shown in the embodiment of FIG. 2, a base portion hole 58 is sufficiently large to allow angular and lateral movement or adjustment of the peg 20.

Figure 4:
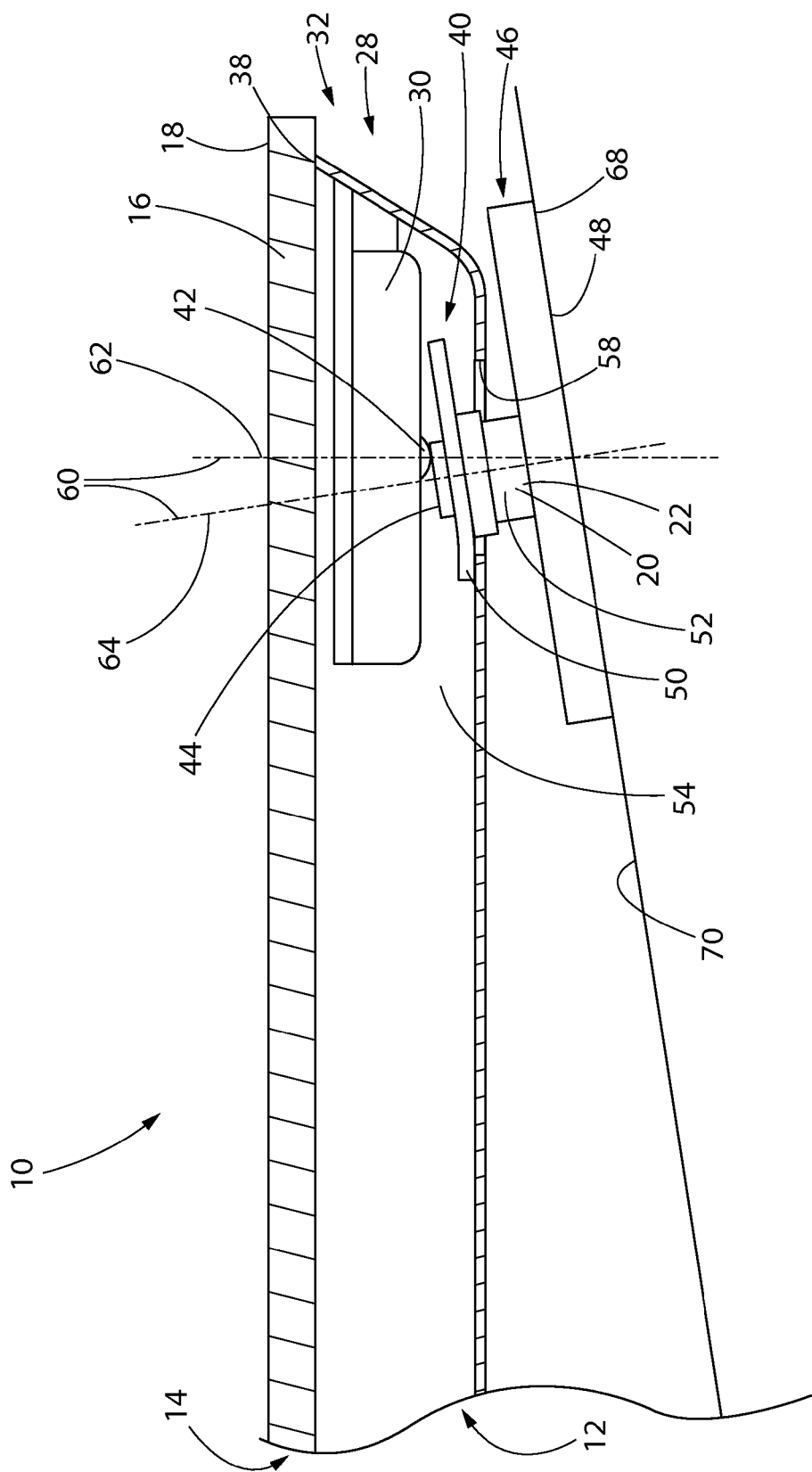
FIG. 4 is an enlarged cross sectional view of a weighing scale in accordance with further aspects of the present disclosure.

Referring now to FIG. 4, the peg 20 of an embodiment of the present disclosure extends along an axis 60 below the platform 16. The peg 20 is moveable or adjustable such that the axis 60 moves from a first position 62 that is perpendicular to the plane 18 formed by the platform 16 or upper portion 14 of the weighing scale 10, as shown in the embodiment of FIG. 2, to a second axis 64 that is not perpendicular to the plane 18, as shown in FIG. 4. In one or more embodiments, one or more of the second peg 22, the third peg 24, and the fourth peg 26 extend along an axis or axes (not shown) because it is/they are adjustable or moveable to be either perpendicular or non-perpendicular to the plane 16 or parallel or non-parallel with one or more of the other pegs 20, 22, 24, 26.

In one or more embodiments, the weighing scale 10 of the present disclosure is positioned over a floor or other surface that is soft and capable of deformation under a weight. In one or more embodiments, the weighing scale 10 of the present disclosure is positioned over a floor or other surface that has multiple support surfaces that are not level and/or parallel. As shown in the embodiment of FIG. 2, the peg assembly 28 of the weighing scale 10 is adjustable such that the bottom surface 48 of the first peg 20 is moveable to align with a first support surface 66. The embodiment of FIG. 4 discloses that a bottom surface 68 of the second peg 22 is moveable to align with a second support surface 70. In an embodiment, the second support surface 70 is nonparallel to the first support surface 66.

Similarly, in one or more additional embodiments (not shown), the bottom surface of the third peg 24 is moveable to align with a third support surface (not shown), whereby the third support surface is not parallel with one or more of the first support surface 66 and the second support surface 70. In one or more additional embodiments (not shown), the bottom of the fourth peg 26 is moveable to align with a fourth support surface (not shown), whereby the fourth support surface is not parallel with one or more of the first support surface 66 and the second support surface 70. The compliant member 50 allows angular motion, such as, by way of example and not of limitation, pivoting or rotation, of the peg 20 and angular positioning of the peg 20 while preserving contact between the peg 20 and the sensor 30. In the embodiments shown in FIGS. 2 and 4, the sensor protrusion 42 of the sensor 30 is positioned at the top surface 44 of the peg 20 to accept contact from the peg 20 regardless of the angular orientation of the peg 20.

As can be understood from the present disclosure, the weighing scale 10 of one or more embodiments discussed herein determines and indicates accurate weight regardless of the type and condition of the surface over which the weighing scale 10 is positioned. One or more of the peg assemblies 28, 32, 34, 36 of the present disclosure adjust to align with one or more support surfaces, which support surfaces (not shown) may be, by way of example and not of limitation, even, soft, uneven, or nonparallel. Such adjustment permits an upward static force to be transmitted from the one or more support surfaces to the one or more sensors and associated electronic or analog assessment components to permit the weighing scale 10 to determine and report the weight of the object on the weighing scale 10 with a degree of accuracy.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

I claim:

1. A weighing scale for measuring the weight of an object, comprising:
   a base portion;
   a platform extending along a plane above the base portion to support the object;
   a peg having an upper portion, which peg extends below the platform along an axis that is adjustable from a first position perpendicular to the plane to a second position not perpendicular to the plane; and
   a sensor disposed at the upper portion of the peg to sense a force between the peg and the platform, wherein the sensor includes a protrusion contacting a top surface of the upper portion of the peg.

2. The weighing scale of claim 1, further comprising a compliant member disposed at the upper portion of the peg to adjustably retain the peg in the base portion.

3. The weighing scale of claim 2, wherein the compliant member is a flexible disk.

4. The weighing scale of claim 1, further comprising a second peg extending below the platform along a second axis that is adjustable from a first position perpendicular to the plane to a second position not perpendicular to the plane.

5. A weighing scale for measuring the weight of an object, comprising:
 a base portion;
 a platform extending along a first plane above the base portion to support the object;
 a first peg having an upper portion, which first peg extends below the platform and defines a first axis;
 a second peg having an upper portion, which second peg extends below the platform and defines a second axis, wherein at least one of the first peg and the second peg is adjustable to a position whereby the first axis is not parallel with the second axis;
 a first sensor disposed at the upper portion of the first peg to sense a force between the first peg and the platform, the first sensor including a first protrusion contacting a top surface of the upper portion of the first peg; and
 a second sensor disposed at the upper portion of the second peg to sense a force between the second peg and the platform, the second sensor including a second protrusion contacting a top surface of the upper portion of the second peg.

6. The weighing scale of claim 5, further comprising a first compliant member disposed at the upper portion of the first peg to adjustably retain the first peg in the base portion.

7. The weighing scale of claim 5, further comprising a second compliant member disposed at the upper portion of the second peg to adjustably retain the second peg in the base portion.

8. The weighing scale of claim 5, further comprising a third peg extending below the platform and defining a third axis, wherein the third peg is adjustable to a position whereby the third axis is not parallel with at least one of the first axis and the second axis.

9. The weighing scale of claim 8, further comprising a fourth peg extending below the platform and defining a fourth axis, wherein the fourth peg is adjustable to a position whereby the fourth axis is not parallel with at least one of the first axis, the second axis, and the third axis.

10. A weighing scale for measuring the weight of an object, comprising:
 an upper portion having a top surface configured to support the object; and
 a base portion comprising a first peg and a second peg, wherein the first peg includes an upper portion and a first bottom surface, which first bottom surface is moveable to align with a first support surface and the second peg includes an upper portion and a second bottom surface, which second bottom surface is moveable to align with a second support surface nonparallel to the first support surface, which base portion includes a first sensor rigidly coupled thereto and disposed at the upper portion of the first peg to sense a force between the first peg and the top surface, the first sensor including a first protrusion contacting a top surface of the upper portion of the first peg.

11. The weighing scale of claim 10, further comprising a second sensor disposed at the upper portion of the second peg to sense a force between the second peg and the top surface.

12. The weighing scale of claim 10, further comprising a first compliant member disposed at the upper portion of the first peg to adjustably retain the first peg in the base portion.

13. The weighing scale of claim 11, further comprising a second compliant member disposed at the upper portion of the second peg to adjustably retain the second peg in the base portion.

14. The weighing scale of claim 10, wherein the base portion further comprises a third peg having a third bottom surface that is moveable to align with a third support surface nonparallel to at least one of the first support surface and the second support surface.

15. The weighing scale of claim 14, wherein the base portion further comprises a fourth peg having a fourth bottom surface that is moveable to align with a fourth support surface nonparallel to at least one of the first support surface, the second support surface, and the third support surface.

16. The weighing scale of claim 2, wherein the compliant member is rotatable while preserving contact between the peg and the sensor.

17. The weighing scale of claim 6, wherein the first compliant member is rotatable while preserving contact between the first peg and the first sensor.

18. The weighing scale of claim 7, wherein the second compliant member is rotatable while preserving contact between the second peg and the second sensor.

19. The weighing scale of claim 12, wherein the first compliant member is rotatable while preserving contact between the first peg and the first sensor.

20. The weighing scale of claim 13, wherein the second compliant member is rotatable while preserving contact between the second peg and the second sensor.

* * * * *